Aug. 6, 1940.   M. P. GOLOD   2,209,967
AUTOMOBILE WHEEL
Filed July 15, 1937   2 Sheets-Sheet 2
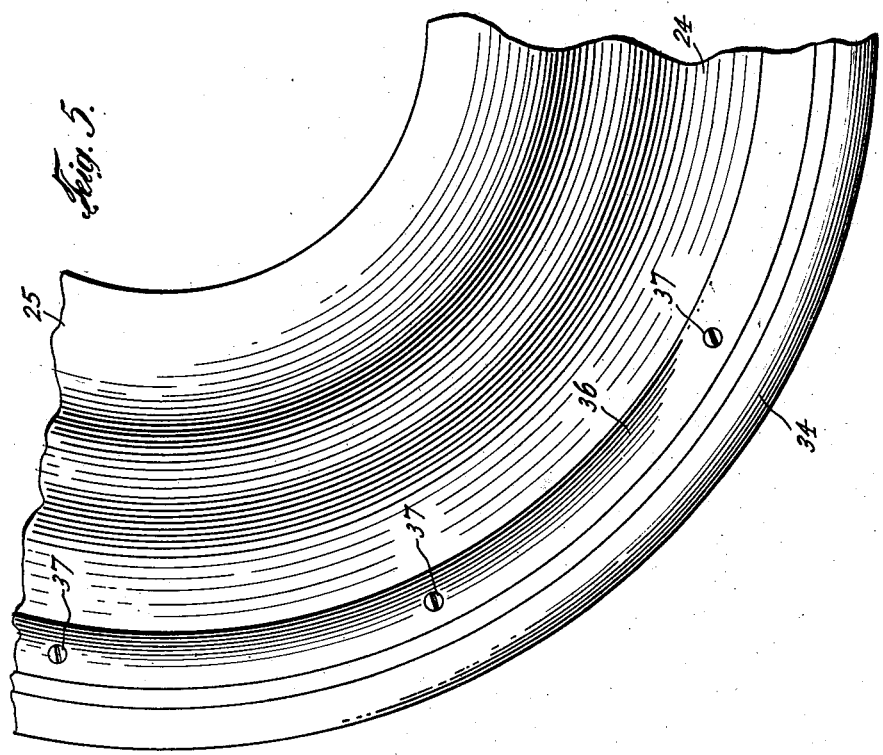
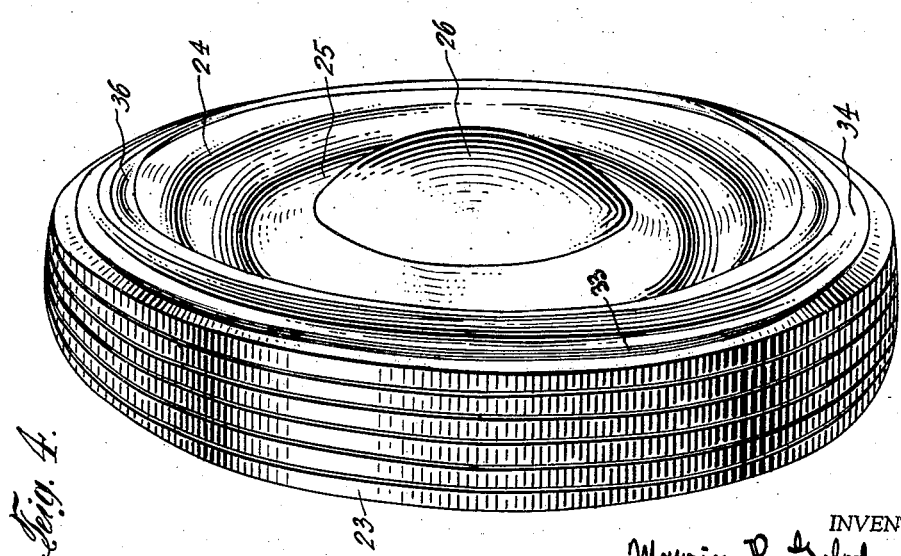
INVENTOR.
Maurice P. Golod
BY Benjamin Webster
ATTORNEY.

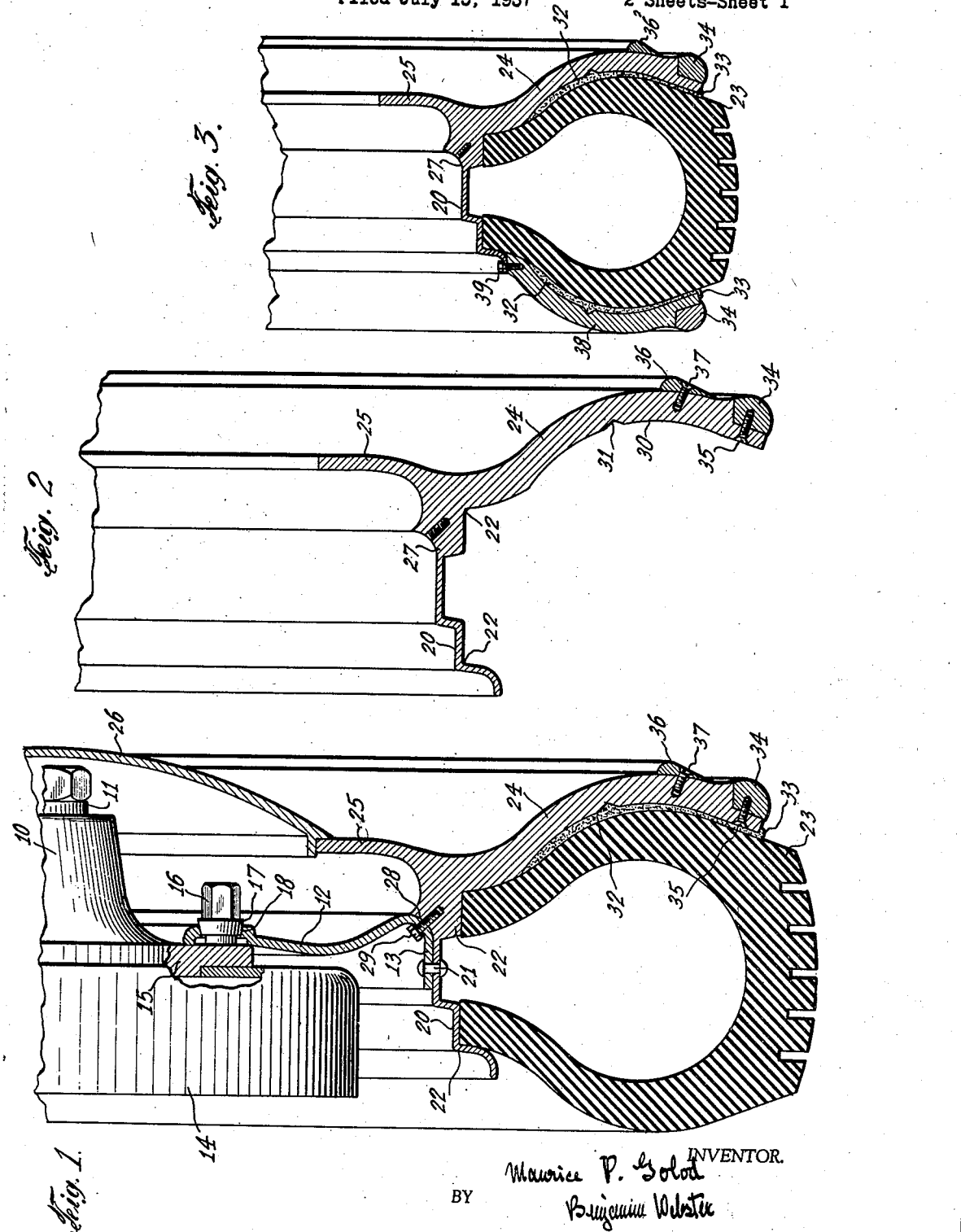

Patented Aug. 6, 1940

2,209,967

UNITED STATES PATENT OFFICE 2,209,967

AUTOMOBILE WHEEL

Maurice P. Golod, New York, N. Y., assignor of one-half to Henry Zeidner, Edgemore, and one-half to Max M. Meyers, New York, N. Y.

Application July 15, 1937, Serial No. 153,750

4 Claims. (Cl. 301—39)

This invention relates to automobile wheels. Countless automobile accidents are caused by the blow-out of tires, especially when automobiles are traveling at high speeds, and such accidents often cause death. When the blow-out of a tire occurs the resultant sudden dropping or settling of the wheel to the roadway causes the automobile, if moving rapidly, to sway, jump, or catapult to one side of the road entirely out of control of the driver of the car.

It is an object of the invention to enhance the safety of automobiling by preventing the dropping or settling of an automobile wheel when the tire blows out. It is a further object of the invention to provide a secondary rim in the wheel for traction of the wheel, of smaller diameter than the inflated tire and becoming operative forthwith when and as the tire is deflated. It is a condition of the present invention that the secondary rim extend radially outwards and inwards around the transverse equatorial zone of the tire and be spaced laterally a sufficient distance from the side edge of the tire to provide for the usual sidewise bulge of the tire as it travels over the roadway under the weight of the vehicle, and further that the diameter of the periphery be also sufficiently less than the diameter of the tire that the flattening of the tread of the tire be compensated for. These conditions vary with the pressure of the air in the inflated tire, but vehicles driven at high speed require for good traction relatively high pressure in the tires and a consequent smaller flattening and side bulge of the tire, and inasmuch as the safety rim is of especial value on such high-speed vehicles the diameter of the rim may approximate that of the tire more closely than when the invention is applied to other vehicles where a rim of smaller diameter may be used to meet the condition of lower air pressure in the tires. It is a further object of the invention to provide such a secondary traction rim supported on a plate mounted directly on the wheel but outside the tire. This plate may be ornamentally designed and may be formed integrally with a plate extending over the entire outside of the wheel. The rim-supporting plate may have a lateral curb-engaging protective rim or bead projecting sidewise beyond the rim-supporting plate and which may be located a short distance from the peripheral traction rim and may be detachable from the plate. The traction rim may also be detachable and formed of a single loop of soft steel and have a gunmetal finish. The rim-plate may curve outwardly at the center more than the adjacent tire, and between the inside of the rim-plate and the outside of the automobile tire may be placed a compressible filling such as soft rubber to compensate for bulging of the tire sidewise caused by varying tire pressure. Inasmuch as it is desirable to reduce as much as possible the weight of the metal in the safety attachment especially near or adjacent the periphery of the wheel I therefore form an annular plate extending inwardly radially and perpendicularly to the axis of the wheel, and having a substantial extent inwardly or a sufficient distance to form a flat-metal annular seat for a wheel hub cap, on the outside of the wheel under the outer side of the automobile wheel tire, thereby providing a reinforcing annular brace for the outer wall that permits the reduction of the tread-supporting and tire-protecting wall to a minimum of weight without the sacrifice of safety in case of sudden tire deflation. The invention not alone enhances safety but also provides a rough practical tire-pressure gage and increases the mileage of automobile tires by increasing the longevity within which the tires may be used with safety. In case of a puncture the automobile may be driven along for miles on the rim provided by this invention without injury to the tire until a repair station is reached, in this way greatly increasing the pleasure of automobiling and eliminating an unpleasant feature, especially to women, namely the hard and dirty job of changing wheels. The invention further tends to prevent side-sway of an automobile by supporting the tires laterally.

The weight of the supplemental rim-plate and rims is so distributed as to produce a desirable rotary momentum effect which improves both the engine efficiency and the stability of the automobile. In sharp turning of the car the plates hold the tire against flattening and so facilitate turning the car about. Should a plate be used also on the inside of the tire it would be possible to cut the size or weight of both plates as they would share the downward stresses together, but the lateral curb-engaging rim would not be required on the inside.

The device possesses sufficient utility alone in the increased beauty of automobile wheels and the resulting enhancement in the saleability of automobiles ornamented with chromium finished or white-metal disk wheels attractively aligned to fully justify and warrant the adoption and use of this invention widely, but in addition to the beauty are the many other desirable mechanical features above enumerated.

Other objects will appear as the description proceeds.

Reference is made to the drawings in which

Figure 1 is a transverse section through my improved wheel.

Figure 2 is a similar view showing only the novel construction in my improved wheel.

Figure 3 is a similar view in which there are parts on both sides of each tire.

Figure 4 is a perspective view.

Figure 5 is a side elevation of a segment of a wheel.

In the embodiment of the invention shown in the drawings the wheel proper is of a standard construction and has a hub 10 mounted on an axle 11 and on which is a circular curved diskplate 12 bent at its periphery to form a flat circular support 13. A brake-drum 14 is mounted on an annular flange 15 by a series of bolts 16 having conical parts 17 lying on conical seats 18 formed in the diskplate 12. It will be understood that any other standard wheel may be utilized.

A metal supporting rim 20 is fastened by bolts 21 to the support 13 and has the usual circular seats 22 on the outside for receiving a pneumatic tire 23 of a standard construction. The outside of the rim 20 supports and forms a side-plate 24 which is circular and curved outwardly to overlie the transverse equatorial zone of the side of the tire 23 which has an inward annular extension 25 extending perpendicularly to the axis of the wheel and under the outer side of the tire compensating for stresses on the wheel when the safety rim 24 supports the vehicle and providing a seat for a central circular convex plate 26 which covers the hub 10 of the wheel and which is removable as is well known in the art. The outer surface of the plate 24 and the extension 25 may be finished in white metal or chromium to present an ornamental appearance. The inner end of the plate 24 may be curved to form a circular concave seat 27 which fits snugly on the circular convex curved surface formed by the bend 28 in the diskplate 12 and may be secured thereto by screws 29.

The inner wall 30 of the plate 24 is provided with a central groove 31 and is remote from the side wall of the tire 23 in its normal pressure condition to provide a space which may be filled with soft rubber in the form of a gasket 32 secured in the groove 31 and by an outward circular collar 33 turned over the inner outer edge of the plate 24 so that the gasket 32 is secured in position and access of dirt and pebbles between the plate 24 and the tire 23 is prevented. The plate 24 mounts at the outer edge a gunmetal-finished tire or rim 34 of soft metal the tread of which is circular in cross-section and which may be detachably secured on the plate 24 by screws 35 and therefore is replaceable if worn or mutilated. A circular lateral rim 36 may be fastened detachably by means of a series of screws 37 to the outer wall of the plate 24, the outer wall of the rim 36 being inclined inwardly so that as it engages a curbing, which is usually inclined upwards away from the roadway, a wedge-like thrust is imparted to the wheel. It is now clear that when the tire 23 is under pressure the safety tire 34 is off the ground.

Referring to Figure 3 an inner plate 38 may be detachably secured by screws 39 to the inner peripheral flange of the rim 20. The rim 36 may be omitted and otherwise the structure is the same as that of an outer plate 24.

Modifications may be made within the spirit and scope of the invention and parts may be used without others.

I claim:

1. An automobile wheel comprising, in combination, an annular member circumferentially mounted on the wheel and including a double-seated rim for supporting an automobile tire, the axially outer wall of the rim projecting outwardly radially and laterally and then axially inwardly towards the periphery of the automobile wheel, and adapted to curve around the portion of the tire that covers the transverse equatorial zone of the inner tube cavity but normally providing a space between the equatorial zone of the tire and the wall so that lateral deformation of the adjacent tire wall outwardly can take place, said wall having an annular plate extending inwardly radially thereof and perpendicularly to the axis of the wheel, and having a substantial extent inwardly, or a sufficient distance to form a flat-metal annular seat for a hub cap on the outside of the wheel under the outer side of the tire, thereby providing a reinforcing annular brace for the outer wall that permits the reduction of the tread-supporting and tire-protecting wall to a minimum of weight without the sacrifice of safety in case of sudden tire collapse, said outer wall having a tread at its periphery and being of such a structure that it supports the proportionate weight of the automobile when the tread engages the ground.

2. An automobile wheel comprising, in combination, an annular member circumferentially mounted on the wheel and including a double-seated rim for supporting an automobile tire, the outer wall of the rim projecting outwardly radially and laterally and inwardly towards the periphery of the automobile wheel, and adapted to curve around the portion of the tire that covers the transverse equatorial zone of the inner tube cavity but normally providing a space between the tire and the wall so that lateral deformation of the adjacent tire wall outwardly can take place, and an annular member forming a curb-guard substantially overlying the center of the side of the tire and mounted on the outside of said wall and projecting laterally outwardly from said wall to prevent contact of said wall proper with a curb, rail, or the like, said outer wall being of such a structure that it provides a tread at its periphery and supports the proportionate weight of the automobile when the tread engages the ground.

3. An automobile wheel comprising, in combination, an annular member circumferentially mounted on the wheel and including a double-seated rim for supporting an automobile tire, the outer wall of the rim projecting outwardly radially and laterally and inwardly towards the periphery of the automobile wheel, and adapted to curve around the portion of the tire that covers the transverse equatorial zone of the inner tube cavity but normally providing a space between the tire and the wall so that lateral deformation of the adjacent tire wall outwardly can take place, an annular member forming a curb-guard mounted on the outside of the wall and projecting laterally outwardly from the wall, and means for detachably mounting said curb-guard on said wall, said outer wall being of such a structure that it provides a tread at its periphery and supports the proportionate weight of the automobile when the tread engages the ground.

4. An automobile wheel comprising, in combination, an annular member circumferentially mounted on the wheel and including a double-seated rim for supporting an automobile tire, the outer wall of said rim projecting outwardly radially and laterally and inwardly towards the periphery of the automobile wheel, and adapted to curve around the portion of the tire that covers the transverse equatorial zone of the inner tube cavity but normally providing a space between the tire and the wall so that lateral deformation of the adjacent tire wall outwardly can take place, and an annular member forming a curb-guard mounted on the outside of said wall and projecting laterally outwardly from said wall, said curb-guard being inclined inwardly toward the periphery of the wall and thereby tending wedgingly to thrust the wheel away from a curbing when engaging the latter, and detachable for replacement, said outer wall being of such a structure that it provides a tread at its periphery and supports the proportionate weight of the automobile when the tread engages the ground.

MAURICE P. GOLOD.